(12) United States Patent
Akizuki et al.

(10) Patent No.: US 6,980,252 B1
(45) Date of Patent: Dec. 27, 2005

(54) ELECTRONIC CAMERA AND BATTERY VOLTAGE CONTROLLING METHOD EMPLOYED THEREIN FOR SUCCESSIVELY, RATHER THAN SIMULTANEOUSLY, OPERATING CAMERA PORTIONS DURING CONDITIONS OF LOW BATTERY VOLTAGE

(75) Inventors: Hiroshi Akizuki, Takatsuki (JP); Nobuhide Dotsubo, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 861 days.

(21) Appl. No.: 08/919,670

(22) Filed: Aug. 28, 1997

(30) Foreign Application Priority Data

Sep. 3, 1996 (JP) .................................. 8-233241

(51) Int. Cl.[7] ........................ H04N 5/225; H04N 5/222
(52) U.S. Cl. ..................................... 348/372; 348/371
(58) Field of Search ............................... 348/372, 371, 348/370, 207, 333; 396/129, 203, 205, 206, 396/373; 386/117; H04N 5/222

(56) References Cited

U.S. PATENT DOCUMENTS

| | | | | |
|---|---|---|---|---|
| 4,242,616 A | | 12/1980 | Takematsu | 315/241 |
| 4,945,424 A | * | 7/1990 | Hiroki et al. | 348/372 |
| 5,155,581 A | * | 10/1992 | Tanaka et al. | |
| 5,210,568 A | * | 5/1993 | Miyake et al. | 348/372 |
| 5,541,656 A | * | 7/1996 | Kare et al. | 348/334 |
| 5,847,836 A | * | 12/1998 | Suzuki et al. | 348/372 |
| 5,854,875 A | * | 12/1998 | Yamagishi | 386/117 |
| 5,864,726 A | * | 1/1999 | Yamamoto | 396/429 |
| 5,963,255 A | * | 10/1999 | Anderson et al. | 348/372 |

FOREIGN PATENT DOCUMENTS

| | | | | |
|---|---|---|---|---|
| EP | 0 658 799 | | 6/1995 | |
| JP | 363237043 A | * | 10/1988 | .......... H04N 5/225 |
| JP | 01231484 | | 9/1989 | |
| JP | 01283529 | | 11/1989 | |
| JP | 02101875 | | 4/1990 | |
| JP | 2-83627 | | 6/1990 | |
| JP | 2-83637 | | 6/1990 | |
| JP | 03187682 | | 8/1991 | |
| JP | 07193773 | | 7/1995 | |

(Continued)

*Primary Examiner*—Ngoc-Yen Vu
*Assistant Examiner*—Luong T. Nguyen
(74) *Attorney, Agent, or Firm*—Michaelson & Associates; Peter L. Michaelson (57) ABSTRACT

An electronic camera free from failures of an internal circuit, such as a signal processing portion, caused by a drop in battery voltage when there remains a small amount of electric charge in the battery, includes a signal processing portion for signal-processing an imaged video signal obtained from an imaging element to form image data, a monitor for displaying the image data, an electronic flash device, a battery for supplying current to the signal processing portion, the monitor and the electronic flash device, a battery voltage detector circuit, and a system controller. She electronic flash device includes a capacitor charged when no light is emitted, and a discharge tube receiving an output from the capacitor and emitting light. The system controller receives an output from the battery voltage detector circuit, determines whether the amount of electric charge remaining in the battery is below a predetermined value, and controls displaying on the monitor and charging of the capacitor such that these operations are simultaneously performed when the amount of electric charge remaining in the battery is below the predetermined value.

12 Claims, 6 Drawing Sheets

FOREIGN PATENT DOCUMENTS

| | | | | | | |
|---|---|---|---|---|---|---|
| JP | 07225149 | 8/1995 | | JP | 10031244 | 2/1998 |
| JP | 08242398 | 9/1996 | | JP | 10031256 | 2/1998 |
| JP | 10026789 | 1/1998 | | JP | 10042181 | 2/1998 |

* cited by examiner

ELECTRONIC CAMERA AND BATTERY VOLTAGE CONTROLLING METHOD EMPLOYED THEREIN FOR SUCCESSIVELY, RATHER THAN SIMULTANEOUSLY, OPERATING CAMERA PORTIONS DURING CONDITIONS OF LOW BATTERY VOLTAGE

BACKGROUND OF THE INVENTION

1. Field of the Invention

The present invention relates to an electronic camera which is provided with an electronic flash and an LCD monitor and uses a battery as a power supply, and to a battery voltage controlling method employed therein.

2. Description of the Background Art

In recent years, electronic cameras in which an image formed by a CCD imager is signal-processed and stored in a recording medium, such as a flash memory, are in common use. In particular, the type integrally equipped with various accessories, such as an electronic flash device and an LCD monitor, commercially preferred.

Typically, this electronic camera uses a battery, such as a dry cell and a secondary cell, as a power supply. Thus, desirably, the load on the battery is reduced as much as possible to contemplate longer life time of the battery itself and variations of battery voltage are also suppressed. With an electronic camera equipped with an electronic flash device, an LCD monitor and the like, however, the load of the electronic flash device, LCD monitor and the like which receive power supplied from the battery as well as the inherent load of the camera portion, such as a CCD imager and a signal processing circuit, poses a significant problem. For the electronic flash device, for example, a large current is required to flow therethrough when the discharge tube of the electronic flash device emits light. Thus, when the capacitor for the electronic flash is charged during either light emission or non-light emission in preparation for the next light emission, a large current will flow from the battery and cause a large load. For the LCD monitor also, a predetermined driving voltage needs to be constantly applied while displaying an image.

As described above, when the load of the electronic flash device and LCD monitor as well as the inherent load of the camera portion is placed on the battery, battery voltage will significantly drop. When a sufficient amount of electric charge remains in the battery, a slight, additional application of load would not cause any particularly problems. When a small amount of electric charge remains in the battery, however, the output voltage will be reduced without any application of load, as compared with the case where a sufficient amount of electric charge remains in battery. If a large load is applied in this condition, a large drop in battery voltage is more readily caused.

The camera portion includes various types of integrated circuits and microcomputers for analog and digital processing. Thus, when battery voltage has significantly dropped, it falls below the lower limit at which the integrated circuits and microcomputers can properly operate, and proper signal processing might not be achieved.

SUMMARY OF THE INVENTION

One object of the present invention is to provide an electronic camera and a battery voltage controlling method employed therein which are free from failures of an internal circuit, such as a signal processing portion, when a small amount of electric charge remains in a battery.

Another object of the present invention is to provide an electronic camera and a battery voltage controlling method employed therein, wherein when a small amount of electric charge remains in a battery, dropping of battery voltage is reduced and failures of an internal circuit, such as a signal processing portion, is thus prevented.

Still another object of the present invention is to provide an electronic camera and a battery voltage controlling method employed therein, wherein when a small amount of electric charge remains in a battery, the concentration of load on the battery is avoided to reduce the dropping of battery voltage and thereby prevent failures of an internal circuit, such as a signal processing portion.

Still another object of the present invention is to provide an electronic camera and a battery voltage controlling method employing therein, wherein failures of an internal circuit, such a signal processing portion, are not caused when a small amount of electric charge remains in a battery and wherein process time can be reduced when a large amount of electric charge remains in the battery.

An electronic camera according to the present invention includes a signal processing portion for signal-processing an imaged video signal obtained from an imaging element to form image data, a monitor for displaying the image data, an electronic flash device, a battery for supplying current to the signal processing portion, the monitor and the electronic flash device, a battery voltage detector circuit, and a system controller. The electronic flash device includes a capacitor which is charged when light is not emitted, and a discharge tube which receives an output of the capacitor and emits light. The system controller receives an output of the battery voltage detector circuit, determines whether the amount of electric charge remaining in the battery is less than a predetermined value, and controls displaying on the monitor and charging of the capacitor not to be simultaneously performed when the amount of electric charge remaining in the battery is less than the predetermined value.

In an electronic camera according to the present invention, displaying on the monitor and charging of the capacitor are not simultaneously performed when the amount of electric charge remaining in the battery is less than a predetermined value. Thus, the concentration of load on the battery can be avoided, and battery voltage will not suddenly drop even when there remains a small amount of electric charge in the battery. This prevents failures of an internal circuit, such as a signal processing portion, attributable to such a rapid drop of battery voltage.

Preferably, the system controller also controls displaying on the monitor and charging of the capacitor to be simultaneously performed when the amount of electric charge remaining in the battery is no less than a predetermined value.

In the electronic camera, the processings of interest for two loads can be simultaneously performed when a large, certain amount of electric charge remains in the battery. Accordingly, process time can be reduced.

A battery voltage controlling method employed in an electronic camera according to the present invention includes the steps of: detecting whether the amount of electric charge remaining in the battery is less than a predetermined value; displaying on the monitor when the amount of electric charge remaining in the battery is less than the predetermined value; and charging the capacitor.

According to the battery voltage controlling method according to the present invention, when the amount of electric charge remaining in the battery is less than the predetermined value, displaying on the monitor and charging of the capacitor are successively performed rather than simultaneously performed. Thus, the concentration of load on the battery can be avoided, and battery voltage will not suddenly drop when there remains a small amount of electric charge in the battery. This can prevent failures of an internal circuit, such as a signal processing portion, attributable to such a sudden drop of battery voltage.

Preferably, the method also includes the step of simultaneously performing displaying on the monitor and charging of the capacitor when the amount of electric charge remaining in the battery is no less than the predetermined value.

According to the battery voltage controlling method, the processings of interest for two loads can simultaneously be performed when there remains a large, certain amount of electric charge in the battery. This can reduce process time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
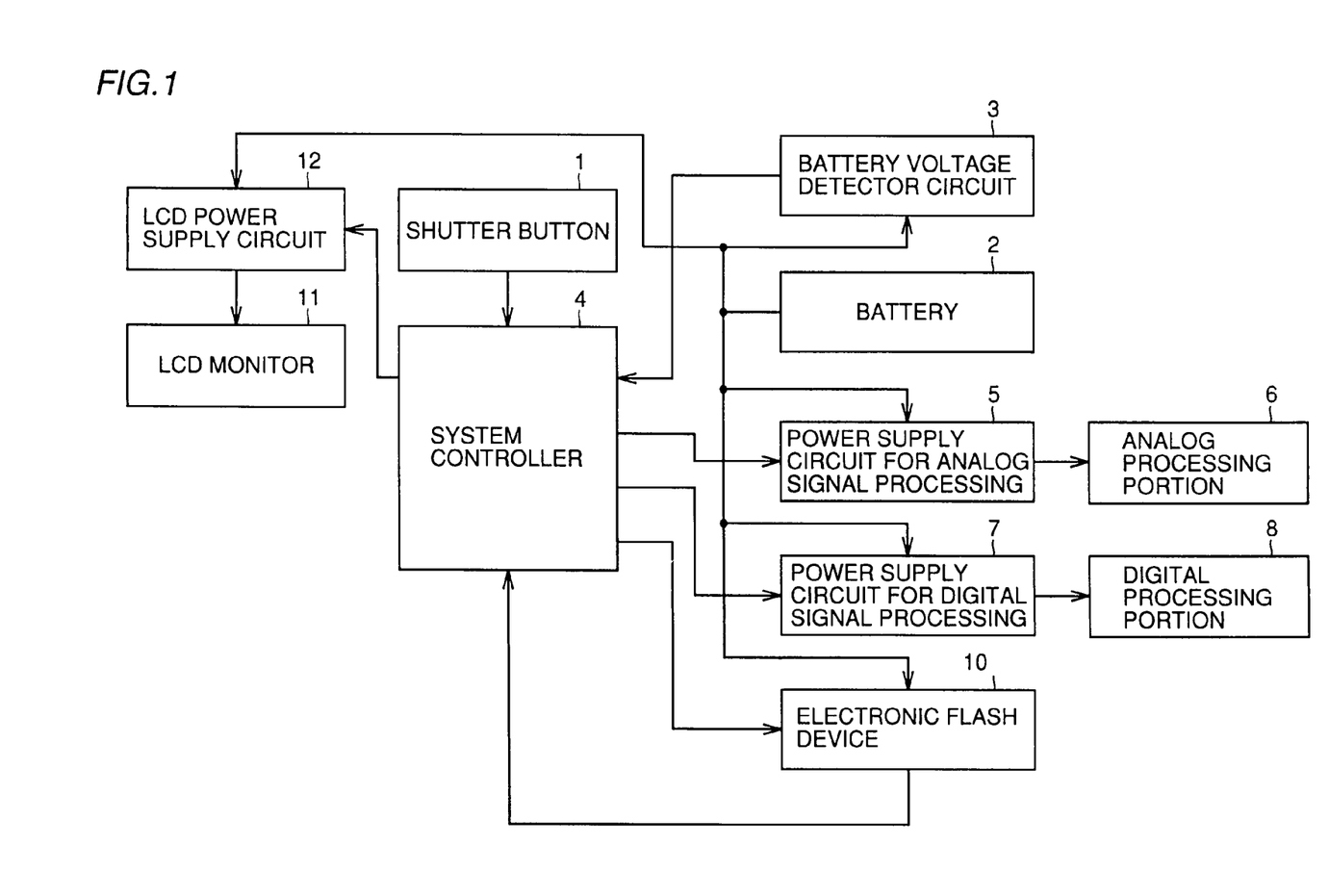
FIG. 1 is a block diagram illustrating for a digital still camera according to one embodiment of the present invention.

Referring to FIG. 1, a digital still camera as one embodiment of the present invention includes: a shutter button 1 via which the user provides an instruction to the camera; a battery 2 removably mounted on the camera; a battery voltage detector circuit 3 for detecting the voltage value at the output stage of battery 2, applying analog-digital conversion of the detected voltage value and outputting the converted voltage value; a system controller 4 receiving an instruction from shutter button 1 and an output from battery voltage detector circuit 3 for controlling the driving of the power supply circuit 5 for processing analog signals, power supply circuit 7 for processing digital signals and LCD power supply circuit 12 described later and for generating various control signals to an electronic flash device 10; an analog processing portion 6 configured of a drive circuit for a CCD imager or the like for processing a video signal in the analog stage; a digital processing portion 8 configured of a color separation circuit, signal compression circuit and the like for processing signals in the stage subsequent to digital conversion of a video signal taken in from analog processing portion 6; and an LCD monitor 11 for displaying an image of an image data obtained through signal processing at digital processing portion 8.

Power supply circuit 5 for analog signal processing receives an output of battery 2 and supplies a driving voltage required for analog processing portion 6. More specifically, power supply circuit 5 for analog signal processing includes a DC/DC converter which changes a battery voltage of 6V into a plurality of DC voltage levels each required for each portion of analog processing portion 6, and the operation of the DC/DC converter is controlled by system controller 4.

Power supply circuit 7 for digital signal processing receives an output from battery 2 and supplies a driving voltage required for digital processing portion 8. Power supply circuit 7 for digital signal processing includes a DC/DC converter which changes the level of battery voltage into a DC voltage level required for digital processing portion 8, as in power supply circuit 5 for analog signal processing, and the operation of this DC/DC converter is also controlled by system controller 4.

Electronic flash device 10 includes voltage booster circuit 35 (see FIG. 2) for boosting the voltage of battery 2, a discharge tube which receives power supply from battery 2 and emits light, and an electronic flash driving circuit which controls the driving of the discharge tube. More specifically, electronic flash device 10 includes a capacitor C which can be charged by battery 2, a discharge tube 32 and a thyristor 33 both connected in parallel with capacitor C, a trigger circuit 31 which applies a high voltage for initiation to discharge tube 32 and also supplies gate current to the gate of thyristor 33, a charge voltage detector circuit 30 which applies analog-digital conversion to that voltage at the both ends of capacitor C which has been divided by resistors R1 and R2 and outputs the converted voltage as charge voltage data, and a switch 34 connected in series to capacitor C.

Figure 2:
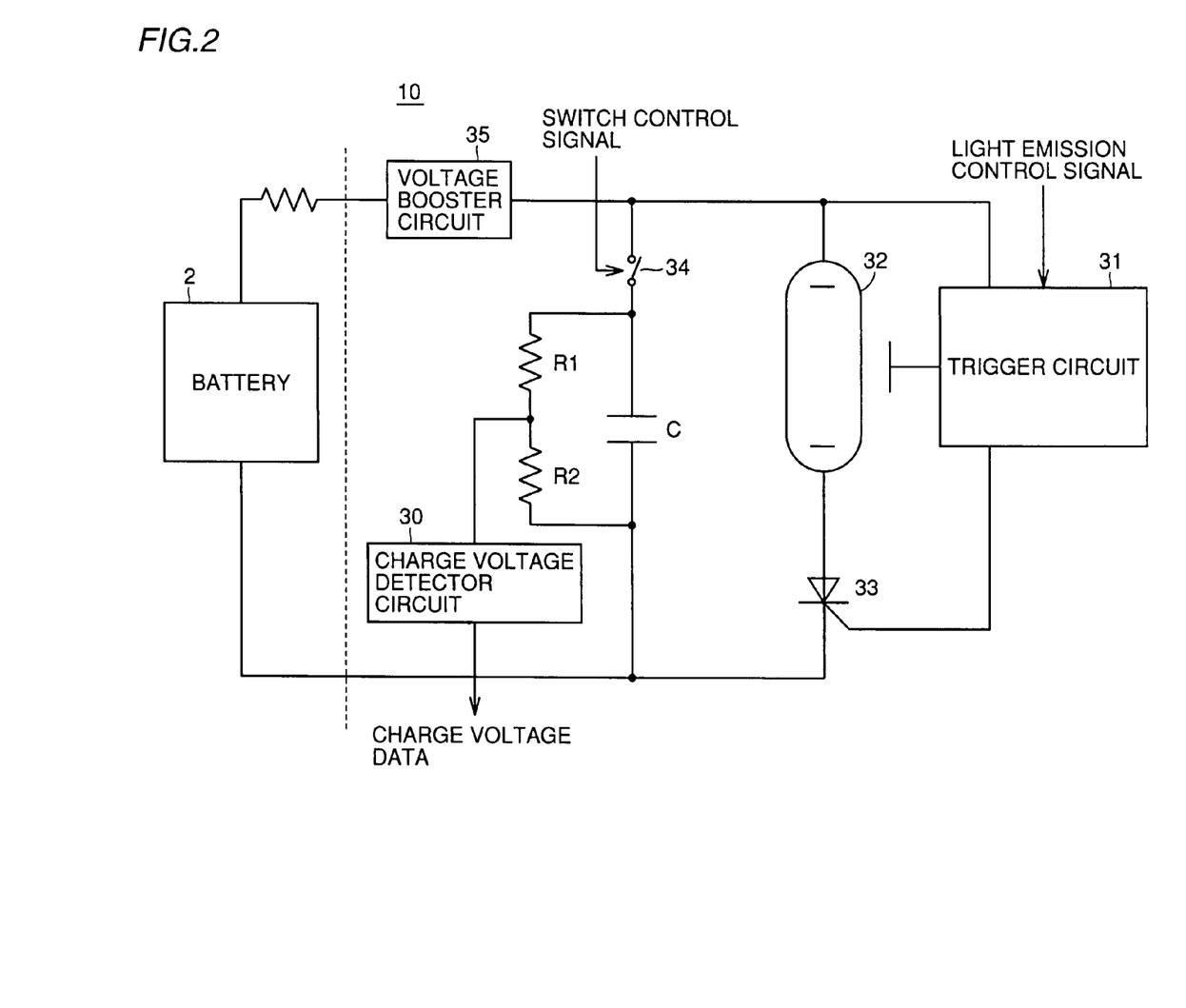
FIG. 2 illustrates an electronic flash device.

Electronic flash device 10 emits light when system controller 4 provides to trigger circuit 31 a light emission control signal, as an instruction to emit light, to apply an initiating, high voltage to discharge tube 32 and simultaneously a base current is applied to the base of thyristor 33 and an output current from capacitor C and that of battery 2 flow into each of discharge tube 32 and thyristor 33.

Charging of capacitor C can be prevented by sending a switch control signal from system controller 4 after the completion of a light emission and thus opening switch 34. In order to charge capacitor C in preparation for the next light emission, the switch control signal is changed to close switch 34 and capacitor C is thus charged by an output from battery 2. Thus, the light emission by discharge tube 32 and the charging of capacitor C can all be controlled by the instructions from system controller 4. When capacitor C has been fully charged, switch 34 need be opened and the charging should be terminated, and system controller 4 compares charge voltage data from charge voltage detector circuit 30 with an expected, predetermined value obtained at full charge to determine whether capacitor C has been fully charged.

Figure 3:
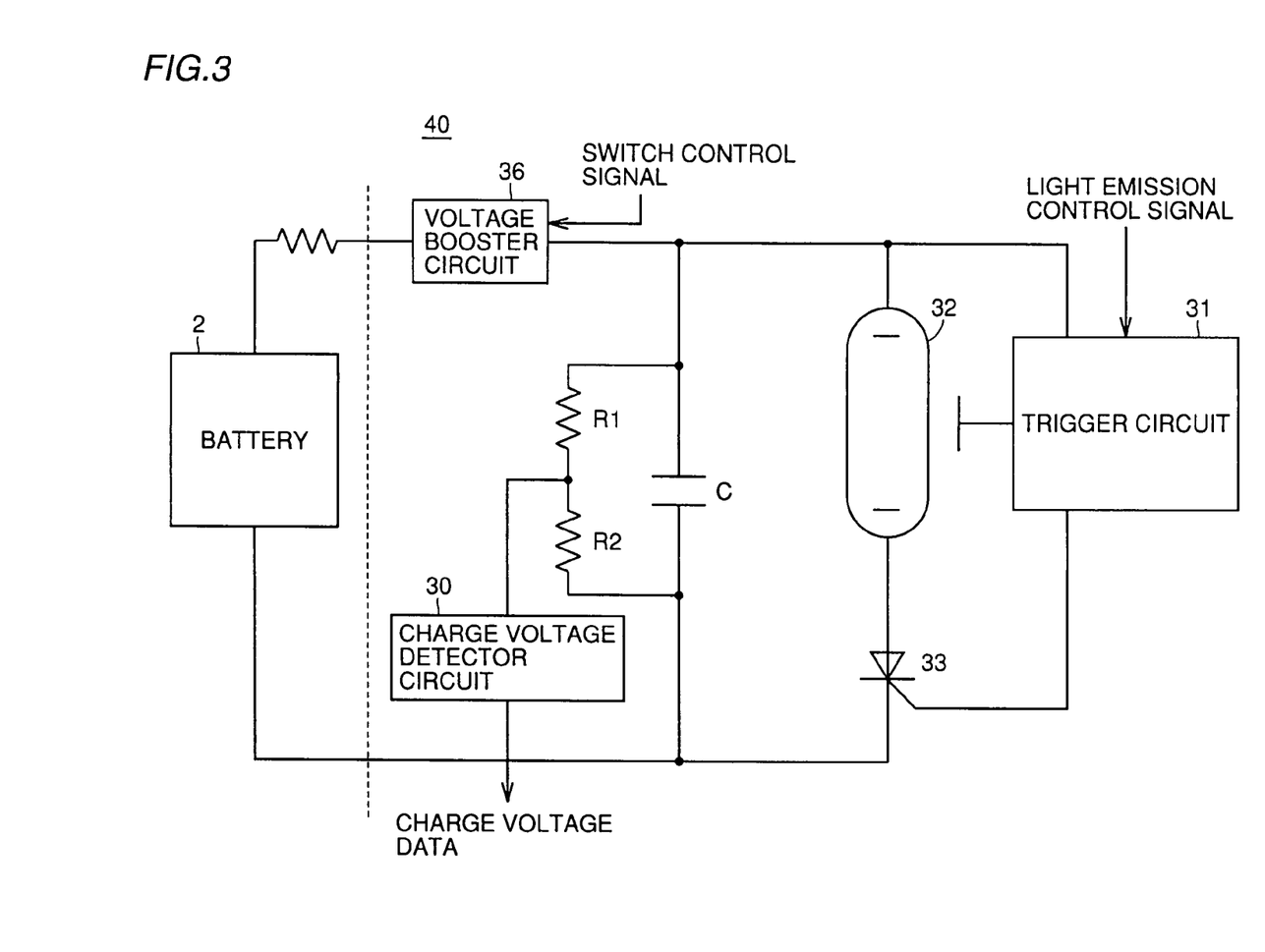
FIG. 3 illustrates an alternate embodiment of the electronic flash device.

Electronic flash device 10 may be replaced with an electronic flash device 40 as shown in FIG. 3. Electronic flash device 40 is an electronic flash device 10 which has switch 34 removed therefrom and also has a voltage booster circuit 35 replaced with a voltage booster circuit 36. Voltage booster circuit 36 receives a switch control signal and controls charging of capacitor C in a similar manner to that of a switch 34. More specifically, voltage booster circuit 36 places itself in the non-operating state in response to the switch control signal and thereby prevents capacitor C from being charged. Furthermore, voltage booster circuit 36 places itself in the operating state and thereby charges capacitor C.

LCD power supply circuit 12, shown in FIG. 1, receives an output of battery 2 and supplies a driving voltage required for LCD monitor 11. It should be noted that LCD power supply circuit 12, as well as power supply circuit 5 for analog signal processing and power supply circuit 7 for digital signal processing, includes a DC-DC converter.

Each portion of this digital still camera operates as follows. First, the operation when the remaining amount of electric charge in battery 2 exceeds 50% and thus there remains a sufficient amount of electric charge in battery 2, will now be described.

Figure 4:
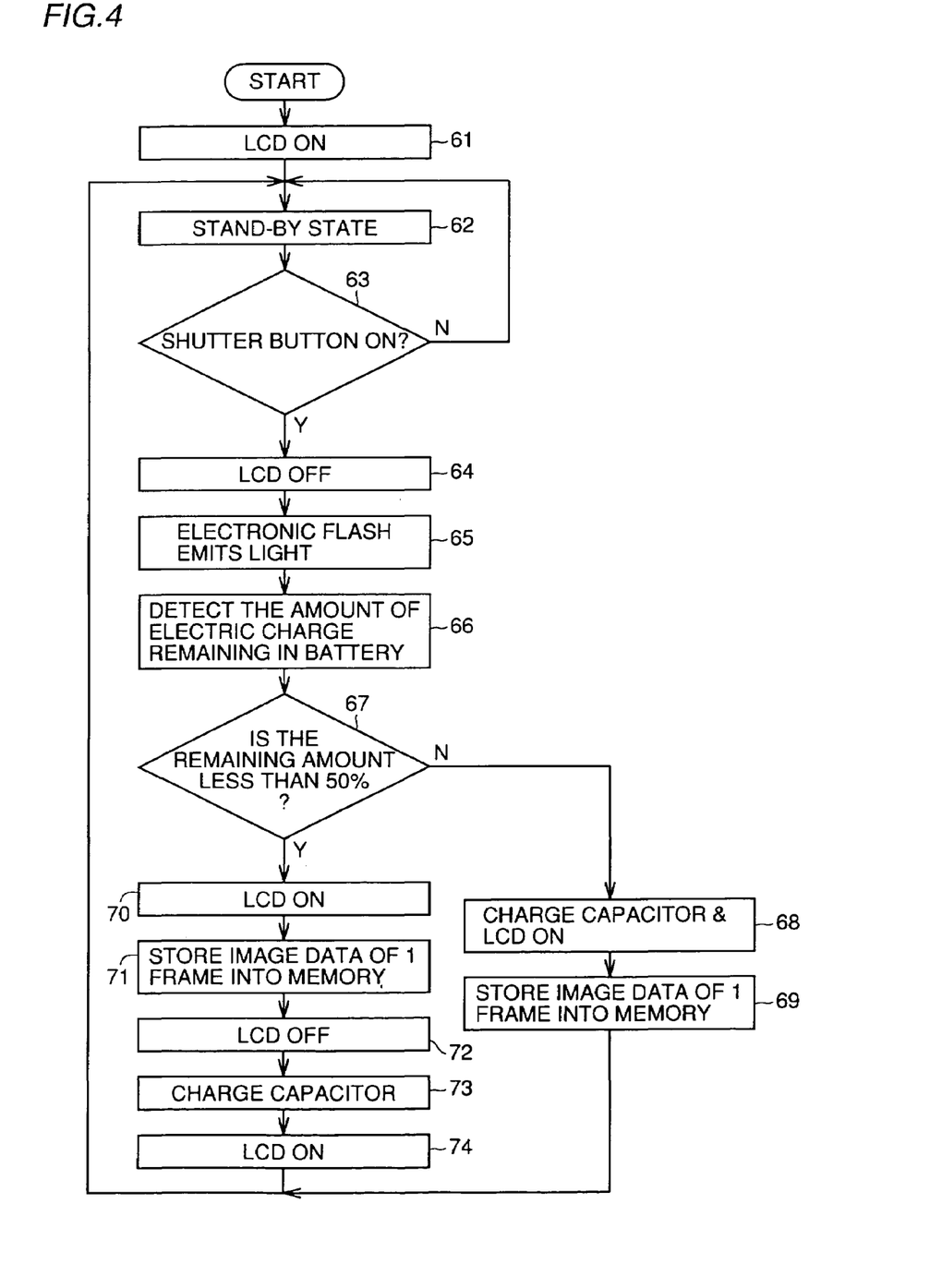
FIG. 4 is a flow chart of a processing in the digital still camera.
Figure 5:
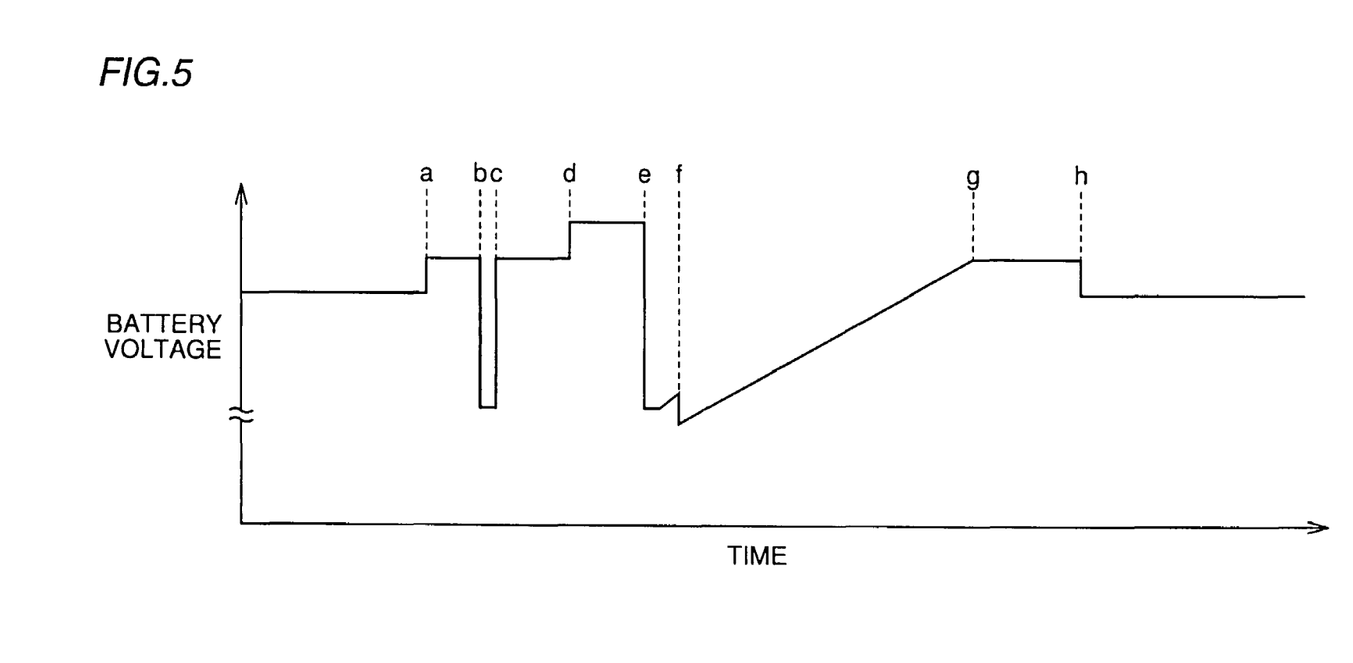
FIG. 5 illustrates a change in battery voltage for a remaining amount of electric charge in the battery of no less than 50%.

Referring to FIGS. 4 and 5, when a power supply switch (not shown) of the camera is operated and the camera is powered on, an instruction is provided from system controller 4 to place power supply circuit 5 for analog signal processing, power supply circuit 7 for digital signal processing and LCD power supply circuit 12 all in the operating state, LCD monitor 11 is initiated (step 61) and the camera is placed in the standby state (step 62). In this standby state, an image signal is obtained by CCD imager in analog processing portion 6. Analog processing portion 6 applies a predetermined analog signal processing to the obtained image signal. Then, well-known signal processings, such as white balance correction, color separation processing and the like, are applied in digital processing portion 8. The image data thus obtained is input to and displayed on LCD monitor 11. While this standby state is maintained, LCD monitor 11 displays images successively. Thus, in this standby state, analog processing portion 6, digital processing portion 8 and LCD monitor 11 are the load on the battery. It should be noted that in the signal processing in digital processing portion 8 in this standby state, the process of compressing the ultimately obtained image data and then storing resulting compressed image data in a flash memory is not performed. Thus, the image data displayed on LCD monitor 11 is only viewed through a view finder.

When shutter button 1 is pressed in this standby state (Y at step 63), the camera is set to the state in the normal photographing mode for taking out image data for recording. In this state of the photographing mode, system controller 4 still holds power supply circuit 5 for analog signal processing and power supply circuit 7 for digital signal processing in the operating state and instructs to place only LCD power supply circuit 12 in the non-operating state. Accordingly, LCD monitor 11 ceasing displaying an image (step 64).

In the state in the photographing mode, the CCD imager of analog processing portion 6 is set to the exposed state, as in the standby state. During the exposure, electronic flash device 10 emits light from timing b through timing c (step 65), and an image signal with the correct exposure is processed in analog signal at analog processing portion 6 and then in digital signal at digital processing portion 8. It should be noted after an image signal for a still image of one frame for storing is taken out from the CCD imager, the CCD imager does not take in the next image until that particular state of the photographing mode is canceled. Thus, power supply circuit 5 for analog signal processing is shifted to the non-operating state at timing d, i.e., when the processing of a still image of one frame is completed and a signal is output to digital processing portion 8. Thus, during the initial period from a through b in the state in the photographing mode, analog processing portion 6 and digital processing portion 8 are the load on battery 2 and as can be seen in F*ig*. 5, battery voltage rises due to the absence of the load of LCD monitor 11, as compared with the battery voltage in the stand-by state. During the period from b through c, analog processing portion 6, digital processing portion 8 and electronic flesh device 10 are the load and thus battery voltage significantly drops by that load. During the period from c through d, analog processing portion 6 and digital processing portion 8 are again the load and thus battery voltage returns to the initial level.

After timing d, at which power supply circuit 5 for analog signal processing goes into the non-operating state, only digital processing portion 8 continues signal processing. Furthermore, by the time when the timing e described later is reached, system controller 4 performs an operation for detecting the amount of remaining electric charge by comparing a detected value of battery voltage with a predetermined threshold value and making a decision that the remaining amount is at least 50% of the full amount when battery voltage exceeds the threshold value and a decision that the remaining amount is less than 50% of the full amount when battery voltage does not reach the threshold value (step 66). The threshold value is here set at an output voltage which can be actually obtained from battery 2 with a load which can be driven by battery 2 having an amount of electric charge remaining in battery 2 of 50%.

When the processing for detecting the remaining amount of electric charge is performed (step 66) and it is determined that the amount of electric charge remaining in battery 2 is at least 50% of the full amount (N at step 67), charging of the capacitor is started at timing e, and during this charging at timing f LCD power supply circuit 12 is operated and an image is displayed on LCD monitor 11 (step 68).

More specifically, when timing e is reached, system controller 4 sends to electronic flash device 10 a switch control signal for instructing to start charging so that the switch is closed and capacitor C is placed in the charged state. This charging state is continued until timing g. Furthermore, at timing f, digital processing portion 8 completes formation of image data of one frame. At this time point, system controller 4 instructs LCD power supply circuit 12 to operate, and LCD monitor 11 is again powered on, takes the image data formed in digital processing portion 8 into an internal video memory and displays the image data as a still image.

Furthermore, after timing f, digital processing portion 8 continues to operate to compress image data and then store it into a flash memory until timing h is reached (step 69). Meanwhile, LCD monitor 11 continues display the image data of one frame taken into the video memory as a still image until timing h is reached and thus the user needs to confirm whether the image data stored into the flash memory as a normal image is a desired image.

Thus, the load during the period from d through e is digital processing portion 8 only. Thus, battery voltage is maintained at the highest level. Furthermore, the load during the period from e through f are digital processing portion 8, electronic flash device 10 and capacitor C. Thus, current flows into the capacitor C having a large capacitance and thus a high load is put on the battery and battery voltage significantly drops. The load during the period from f through g are digital processing portion 8, capacitor C and LCD monitor 11. Thus, battery voltage further drops by the load of LCD monitor 11, although it is gradually increased as capacitor C is charged. Furthermore, the load during the period from g through h are digital processing portion 8 and LCD monitor 11.

After the storing of a desired image data of one frame into the flash memory is thus completed at timing h, a stand-by state is maintained until shutter button 1 is again pressed.

As described above, when there remains an amount of electric charge of at least 50% in battery 2, the output voltage is maintained at sufficiently high level if the load is somewhat increased. Thus, when the respective loads of LCD monitor 11 and capacitor C are simultaneously applied during the period from f through g in addition to the load of digital processing portion 8, which is essential as signal processing, the output voltage of power supply circuit 7 for digital signal processing will still maintain a driving voltage required for digital processing portion 8. Thus, it is preferable that the loads of digital processing portion 8, LCD monitor 11 and capacitor C are simultaneously applied to reduce process time. When the amount of electric charge remaining in the battery is less than 50%, however, even a slight load will significantly decrease the output voltage of battery 2. Thus, when the loads of LCD monitor 11 and capacitor C are simultaneously applied, battery voltage rapidly drops and the output voltage of power supply circuit 7 for digital signal processing cannot maintain a sufficent driving voltage required for digital processing portion 8. Accordingly, various ICs and microcomputers which configure digital processing portion 8 go to the stop or reset state and cannot normally operate.

Thus, when a detection of the remaining amount of electric charge in the battery at step 66, shown in FIG. 4, results in the decision that the remaining amount is less than 50% (Y at step 67), the series of processings of steps 70–74 are performed.

Figure 6:
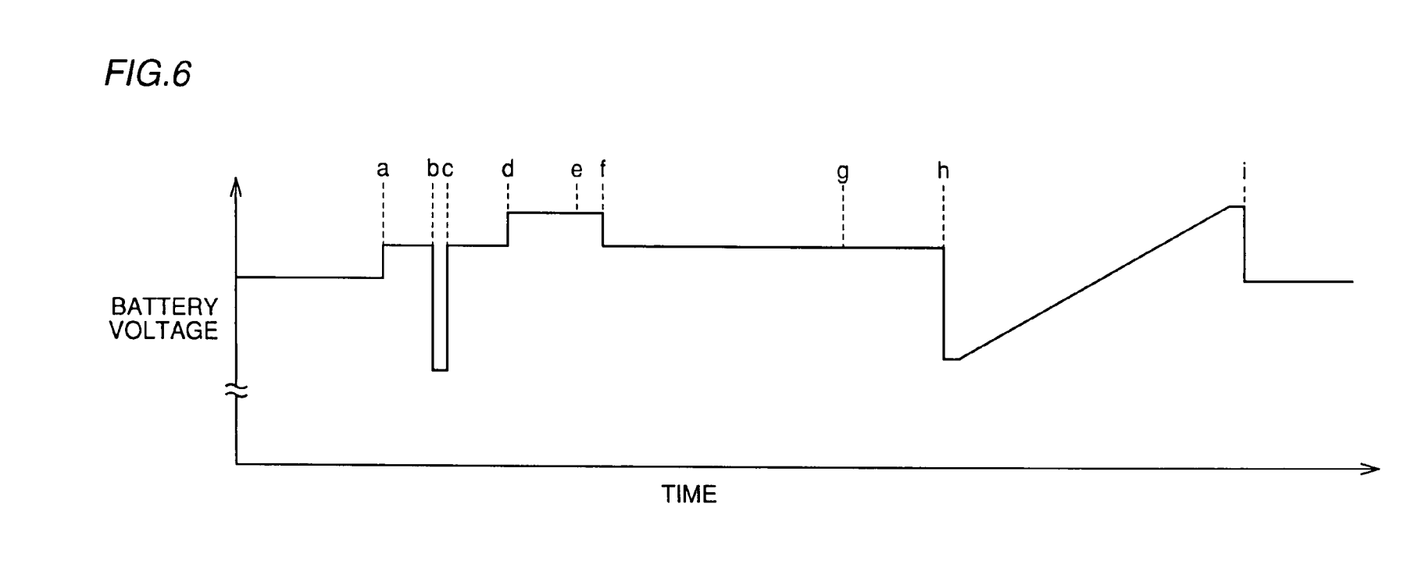
FIG. 6 illustrates a change in battery voltage for a remaining amount of electric charge in the battery of less than 50%.

The battery voltage during the series of processings changes as shown in FIG. 6. That is, the processing at analog processing portion 6 is completed and power supply circuit 5 for analog signal processing goes into the non-operating state at timing d and then only digital processing portion 8 performs signal processing which is completed at timing f, as is described above. However, when timing e is reached during this period, system controller 4 does not particularly instruct electronic flash device 10 to start charging. Thus, only digital processing portion 8 is the load on the battery until timing f is reached.

Then, system controller 4 instructs LCD power supply circuit 12 to operate (step 70). This allows LCD monitor 11 to take into the video memory the image data of one frame which has been processed at digital processing portion 8 and to display a still image. Digital processing portion 8 completes at timing h the processing for image-compressing the formed image data and storing it into the flash memory (step 71). The displaying of the still image on LCD monitor 11 is continued until timing h is reached. Thus, digital processing portion 8 and LCD monitor 11 are the load on battery 2 during the period from f through h.

When timing h is reached, the digital signal processing is not necessitated, and system controller 4 instructs power supply circuit 7 for digital signal processing to stop operating and instructs LCD power supply circuit 12 to stop operating (step 72). LCD monitor 11 thus stops image displaying. Simultaneously, system controller 4 sends a switch control signal to electronic flash device 10 to close switch 34 and start to charge capacitor C, (step 73). Capacitor C is kept charged until timing i is reached. During this charging period from h through i, power supply circuit 5 for analog signal processing, power supply circuit 7 for digital signal processing and LCD power supply circuit 12 are maintained in the non-operating state and only capacitor C is the load on battery 2. When timing i is thus reached and the charging of capacitor C is completed, system controller 4 instructs LCD power supply circuit 12 to operate so that LCD monitor 11 is placed in the image-displaying state (step 74). Simultaneously, system controller 4 can instruct power supply circuit 5 for analog signal processing and power supply circuit 7 for digital signal processing to operate to resume the processings at analog and digital processing portions 6 and 8 so that they return to the stand-by state.

The image display on LCD monitor 11 and the charging of capacitor C in electronic flash device 10 are thus performed in time division manner when the amount of remaining electric charge is less than 50%. While this slightly increases process time, two loads are not simultaneously applied to battery 2 and a drop of battery voltage can thus be suppressed. Thus, the output voltage of power supply circuit 7 for digital signal processing does not fail to maintain a defined voltage value during the period from f through g.

Although the above embodiment is described for 50% of the full amount of electric charge remaining in the battery as the threshold value of the amount of electric charge remaining in the battery for determining whether the driving of LCD monitor 11 and the charging of capacitor C in electronic flash device 10 should be simultaneously performed, the threshold value is not limited to 50% and may be set at any optimal value, e.g., 30% or 10%, depending on the relation between the load and the battery. Furthermore, the timing at which battery voltage is detected is not limited to the period from d through e and may be any period during which a large variation is not caused in battery voltage, such as the period from a through b.

Furthermore, the result of which detection of the amount of remaining electric charge that is performed by system controller 4 is used not only for switching loads but can be configured to be displayed on means for displaying the remaining amount (not shown) and thus informed to the user.

According to the invention described above, when a small amount of electric charge remains in the battery, the displaying on the LCD monitor and the charging of the capacitor for the electronic flash can be performed in time division manner to eliminate the possibility of a rapid drop in battery voltage caused by the two types of loads simultaneously applied to the battery and prevent adverse effects on other signal processing circuits and the like. When there remains a large amount of electric charge in the battery, the processings of interest for the two types of loads can be simultaneously performed to reduce process time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera comprising:
  a signal processing portion for processing an imaged video signal obtained from an imaging element to form image data;
  a monitor for displaying said image data;
  an electronic flash device;
  a battery for supplying voltage to said signal processing portion, said monitor and said electronic flash device;
  a battery voltage detector circuit; and
  a system controller;
  wherein:
    said electronic flash device includes a capacitor charged when no light is emitted from the flash device, and a discharge tube which receives an output from capacitor and, in response thereto, emits light; and
    said system controller receives an output from said battery voltage detector circuit, determines whether an amount of electric charge remaining in said battery is below a predetermined value, and controls displaying on said monitor and charging of said capacitor such that, when the amount of electric charge remaining in said battery is below said predetermined value, display of the image data and charging of the capacitor are not simultaneously performed and an operation of displaying the image data on the monitor and recording the image data on a recording medium is completed before an operation of charging the capacitor occurs so that the image data will be preserved on the medium should the battery voltage, as a result of the charging operation, decrease below a level at which the camera would record the image, wherein the image data is displayed on the monitor after the image has been recorded but before the capacitor has begun charging such that, through display of the image data, a user is informed that the image data has been recorded on the medium.

2. The electronic camera according to claim 1, wherein said system controller also controls displaying on said monitor and charging of said capacitor such that display of the image data and charging of the capacitor are simultaneously performed when the amount of electric charge remaining in said battery is at least equal to said predetermined value.

3. The electronic camera according to claim 1, wherein said predetermined value represents half of a full amount of the electric charge stored in said battery.

4. The electronic camera according to claim 3, wherein said system controller also controls displaying on said monitor and charging of said capacitor such that display of the image data and charging of the capacitor are simultaneously performed when the amount of electric charge remaining in said battery is at least equal to said predetermined value.

5. The electronic camera according to claim 1, wherein said monitor is an LCD monitor.

6. The electronic camera according to claim 1, further comprising a digital processing portion for applying a digital-signal processing to a video signal.

7. A battery voltage controlling method employed in an electronic camera, comprising the steps of:
   detecting whether an amount of electric charge remaining in a battery is below a predetermined value; and
   successively performing displaying on a monitor and charging of a capacitor when said amount of electric charge remaining in said battery is below said predetermined value such that an operation of displaying and recording image data is completed before an operation of charging the capacitor occurs so that the image data will be preserved on the medium should voltage produced by the battery, as a result of the charging operation, decrease below a level at which the camera would record the image, wherein the image data is displayed on the monitor after the image has been recorded but before the capacitor has begun charging such that, through display of the image data, a user is informed that the image data has been recorded on the medium.

8. The battery voltage controlling method according to claim 7, further comprising the step of simultaneously performing displaying on said monitor and charging of said capacitor when said amount of electric charge remaining in said battery is at least equal to said predetermined value.

9. The battery voltage controlling method according to claim 7, wherein said predetermined value represents half of a full amount of the electric charge stored in said battery.

10. The battery voltage controlling method according to claim 9, further comprising the step of simultaneously performing displaying on said monitor and charging of said capacitor when said amount of electric charge-remaining in said battery is at least equal to said predetermined value.

11. An electronic camera comprising:
    an operation key;
    a signal processing portion for processing an imaged video signal obtained from an imaging element to form image data and storing said image data on a recording medium in response to operation of said operation key;
    a monitor for displaying said image data thereon;
    an electronic flash device;
    a battery for supplying voltage to said signal processing portion, said monitor and said electronic flash device;
    a battery voltage detector circuit connected to said battery; and
    a system controller connected to said battery voltage detector circuit, said monitor, said signal processing portion and said electronic flash device;
    wherein:
       said electronic flash device has a capacitor charged with current supplied from said battery when said electronic flash does not emit a flash of light, and a discharge tube which receives an output from said capacitor and, in response thereto, produces the flash of light; and
       said system controller receives an output from said battery voltage detector circuit and determines whether a remaining amount of electric charge in the battery is below a predetermined value, and, if the remaining amount of the charge is below the predetermined value, does not permit displaying on said monitor and charging of said capacitor to occur simultaneously, such that the system controller prevents the capacitor from being charged while the monitor is displaying the image data when one screen of the image data is being recorded on the recording medium, and controls the monitor to be inoperative while said capacitor is being charged after one screen of said image data has been completely recorded on the recording medium so that the image data will be preserved on the medium should the battery voltage, as a result of the charging operation, decrease below a level at which the camera would record the image, wherein the image data is displayed on the monitor after the image has been recorded but before the capacitor has begun charging such that, through display of the image data, a user is informed that the image data has been recorded on the medium.

12. The electronic camera is claim 11, wherein, after said capacitor has been completely charged, said system controller prohibits the capacitor from being charged and causes the monitor to operate.

* * * * *